Nov. 15, 1955  J. W. SHEPERDSON  2,724,080
DRIVING AND CONTROL APPARATUS
Filed Feb. 24, 1951
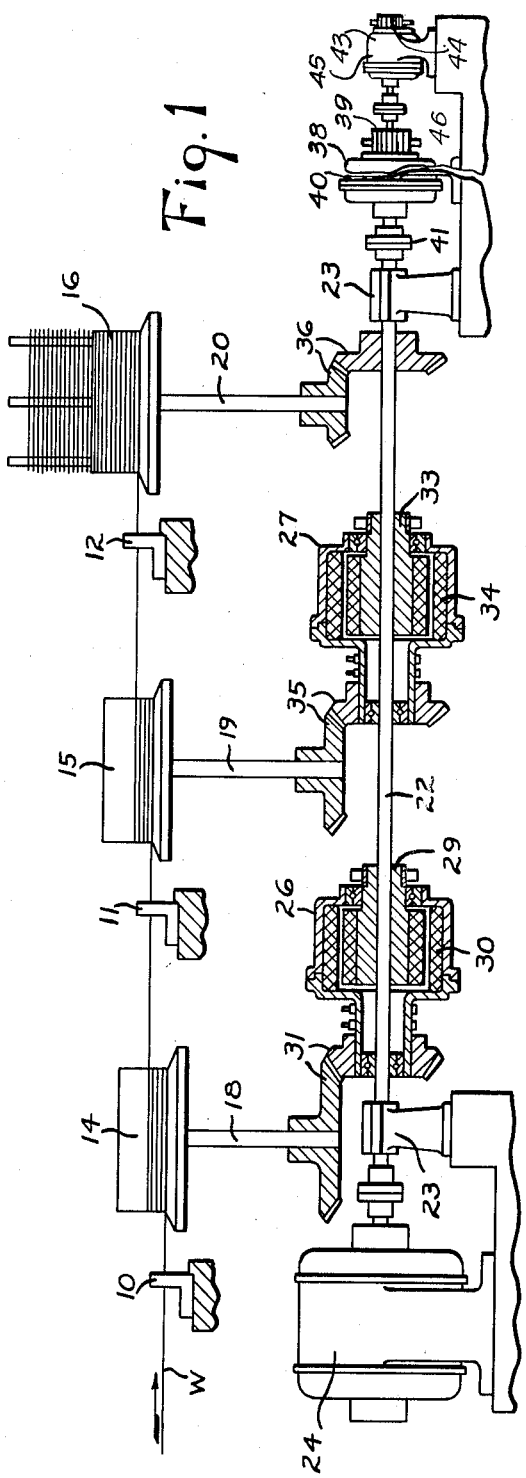
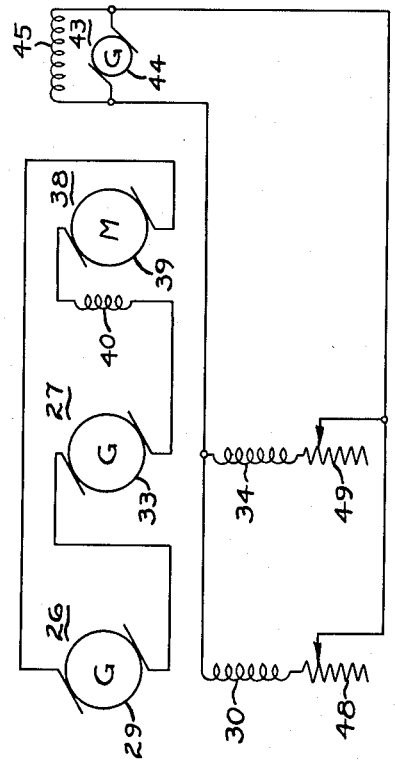
INVENTOR.
JOHN W. SHEPERDSON
BY
Albert G. Blazejak
ATTORNEY United States Patent Office 2,724,080
Patented Nov. 15, 1955

2,724,080

DRIVING AND CONTROL APPARATUS

John W. Sheperdson, Worcester, Mass., assignor to Morgan Construction Company, Worcester, Mass., a corporation of Massachusetts Application February 24, 1951, Serial No. 212,622

5 Claims. (Cl. 318—46)

This invention relates to driving and control apparatus, and more particularly to an improved apparatus for driving and controlling the rotatable drums or blocks which serve to draw wire successively through the dies of a continuous wire-drawing machine.

Certain difficult problems arise in driving machines of this type. Since the wire is reduced in cross section at each die and thereby elongated, its linear speed necessarily increases in successive steps. As the dies gradually become worn, the amount of elongation will change, and the wire speed will likewise change. If there is to be no accumulation of wire between successive dies and no slippage between the wire and the peripheral surfaces of the drums about which the wire is wrapped, each drum must rotate at a surface speed corresponding to the linear speed of the adjacent portion of the wire. To obtain such results it has been proposed to drive the individual drums by means of slipping clutches such as hydraulic clutches, electrical eddy current clutches, and the like. In all such cases, however, the slipping of the clutches represents waste energy, which is an economic loss. Furthermore, this wasted energy is dissipated in the form of heat, which is often very undesirable because of its effect on the room temperature, particularly during warm weather.

It is accordingly one object of the invention to provide a simple and efficient apparatus for driving the drums of a continuous wire-drawing machine and maintaining the speed of each drum in exact synchronism with the speed of the adjacent portion of the wire.

It is a further object of the invention to provide a driving and control apparatus whereby the drums of a continuous wire-drawing machine may be driven at exactly the correct speeds without wasting energy or producing excessive heat.

With these and other objects in view, as will be apparent to those skilled in the art, the invention resides in the combination of parts set forth in the specification and covered by the claims appended hereto.

In accordance with the invention in its preferred form, there is provided a series of dynamo electric machines, preferably of the direct current type, each having two relatively rotatable elements, i. e. an armature and a field. One element in each machine, preferably the armature, is mechanically connected to a common driving device, for example a rotatable shaft driven by a suitable main motor. The other element in each machine, preferably the field, is adapted for mechanical connection to one of the drums of a continuous wire-drawing machine so that the drum and the associated field will rotate at speeds having a predetermined ratio. These dynamo electric machines, as so far described, are one less in number than there are drums in the wire-drawing machine, and the extra drum (which is preferably the final drum in the series) is mechanically connected to the common driving device or shaft. There is also provided an additional dynamo electric machine, preferably a direct current motor having one of its elements, say its armature, mechanically connected to the common driving device, and its other element stationary. The armatures of the said dynamo electric machines are electrically connected in a series circuit. When the shaft is rotated by the main motor, thus causing the armatures of all the dynamo electric machines to rotate in unison, and their fields are energized, one or more of the machines will serve as generators, an electric current will be generated in their armatures, and torque will be applied to the fields and thence through the mechanical connections to the respective capstans. These torques can be controlled by adjustment of the field strengths. The current generated in the armatures will not be dissipated in heat, since it will flow in the series circuit through the armature of the direct current motor and cause the latter to apply forward driving torque to the shaft. This will reduce the power required from the main motor.

Referring to the drawings illustrating one embodiment of the invention and in which like reference numerals indicate like parts, Fig. 1 is a somewhat diagrammatic elevation of the continuous wire-drawing machine with the improved driving and controlling apparatus applied thereto, certain parts being shown in section for clearness of illustration; and Fig. 2 is a diagram of the electrical circuits employed.

In Fig. 1 there is shown a continuous wire drawing machine comprising a series of dies 10, 11, and 12 and a series of rotatable drums or blocks 14, 15 and 16 to draw the wire W through the dies successively. These drums are provided with shafts 18, 19 and 20 respectively.

The invention provides an improved driving mechanism for the machine, whereby the final drum 16 may be positively driven at a desired speed, and predetermined forward driving torques may be applied to the drums 14 and 15. For this purpose a shaft 22 is rotatably mounted in suitable bearings 23—23 and driven by suitable means such as an alternating current electric motor 24. For driving the two drums 14 and 15 there are provided two dynamo electric machines 26 and 27 respectively, preferably of the direct current type and each having an armature and a field forming two relatively rotatable elements. The machine 26 has an armature 29 secured to the main shaft 22, and a surrounding rotatable field 30 connected to the shaft 18 of the drum 14 by bevel gearing 31. The machine 27 has an armature 33 secured to the main shaft 22, and a surrounding rotatable field 34 connected to the shaft 19 of the drum 15 by bevel gearing 35. The main shaft 22 is connected to the shaft 20 of the final drum 16 by bevel gearing 36. There is also provided an additional dynamo electric machine 38, preferably in the form of a direct current motor having a rotatable armature 39 and a stationary series field 40. The armature 39 is connected to the main shaft 22 by a coupling 41. For exciting the fields 30 and 34 there is provided a direct current generator 43 having a rotatable armature 44 and a surrounding stationary field 45. The armature 44 is connected to the armature 39 by a coupling 46. As shown in Fig. 2, the armatures 29, 33, and 39 are connected in a series electrical circuit. Also the fields 30 and 34 are provided with control rheostats 48 and 49 respectively and are electrically connected to the generator 43.

In the operation of the invention one or more of the machines 26, 27, and 38 will serve as a generator, and one or more will serve as a motor. In the case of the machines 26 and 27, this will depend upon the ratios of the several sets of gearing through which the wire-drawing drums are driven. The relative speeds of the drums are of course determined by the reductions in wire size effected by the dies, it being the intention that there shall be no slippage of the drums within the surrounding convolutions of wire.

In the drawings, the machines 26 and 27 are indicated as generators, and the machine 38 as a motor. This requires the gearing to be such that the main shaft 22, with the armatures 29 and 33, rotate somewhat faster than the fields 30 and 34, so that an electric current will be generated in the armatures. This will produce a torque in each machine which is a function of the current and the field strength, and independent of the speed. Such torque is employed to drive the corresponding drum, the torque being adjustable to a desired value by adjustment of the corresponding field rheostat. Since the armatures 29, 33, and 39 are connected in a series circuit, the same current will flow through them all. This current, which is produced by the generators 26 and 27, will serve to operate the motor 38 and cause this motor to apply a forward driving torque to the main shaft. This will reduce the load on the main motor 24.

In case the gearing is such that the field of one of the machines 26 or 27 must rotate somewhat faster than its armature, in order to maintain the required speed for the associated capstan, such machine will operate as a motor. The torque applied to the capstan will be a function of the current and the field strength, and it can readily be adjusted by means of the field rheostat to provide the desired tension in the wire.

From the above description it will be clear that the invention requires that one or more of the dynamo electric machines operate as a motor. The electrical power produced by the generator or generators is employed in the motor or motors to assist in driving the wire-drawing machine and thereby reduce the power which would otherwise be required from the main motor 24. Thus the wasting of power by the production of heat is avoided.

Having thus described my invention, what I claim as new and desire to secure by Letters Patent is:

1. A driving and control apparatus for a series of rotatable drums whose speeds of rotation are to be maintained in a predetermined relationship, the said apparatus comprising a rotatable driving means, a series of dynamo electric machines each having an armature and a field member forming two relatively rotatable elements, one element in each machine being mechanically connected to the driving means and the other element being adapted for mechanical connection to one of the rotatable drums to drive the same, an additional dynamo electric machine having an armature and a field member forming two relatively rotatable elements, one of the last-mentioned elements being mechanically connected to the driving means and the other being stationary, and means electrically connecting the armatures of all the dynamo electric machines in a series circuit.

2. An apparatus as set forth in claim 1, in which the rotatable driving means is constructed and adapted for mechanical connection to a drum of the series.

3. A driving and control apparatus for a series of rotatable drums, the said apparatus comprising a rotatable shaft adapted for mechanical connection to one of the drums of the machine, main driving means for the shaft, a dynamo electric machine for each of the other drums of the machine, each dynamo electric machine having an armature mounted on the shaft to rotate therewith and a rotatable field member adapted for mechanical connection to the corresponding drum, a motor having an armature mechanically connected to the shaft and a stationary field member, means electrically connecting the armatures of the dynamo electric machines and motor in a series circuit, means to energize the field members of the dynamo electric machines, and adjustable means to vary the energization of the field member of each dynamo electric machine.

4. A driving and control apparatus for a series of driven members, the said apparatus comprising a rotatable shaft adapted for mechanical connection to a member of said series, main driving means for the shaft, a direct current generator for each of the other members, each generator having an armature mounted on the shaft to rotate therewith and a rotatable field member adapted for mechanical connection to the corresponding member, a direct current motor having an armature mechanically connected to the shaft and a stationary field member, means electrically connecting the armatures of the generators and motor in a series circuit, means to energize the field members of the generators, and adjustable means to vary the energization of each generator field member.

5. A driving and control apparatus for a series of driven members, the said apparatus comprising a rotatable shaft adapted for direct mechanical connection to a member of said series, a main driving motor for the shaft, a direct current generator for each of the other members, each generator having an armature mounted coaxially on the shaft to rotate therewith and a rotatable field member adapted for mechanical connection to the corresponding member, a direct current motor having an armature mechanically connected to the shaft and a stationary field member, means electrically connecting the armatures of the generators and said motor in a series circuit, means to energize the field members of the generators, and an adjustable rheostat to vary the energization of each generator field member, the driven members operating successively upon an elongated article under tension in such a manner that forces are transmitted from one member to another.

References Cited in the file of this patent

UNITED STATES PATENTS

| Number | Name | Date |
|---|---|---|
| 847,079 | Johannett | Mar. 12, 1907 |
| 871,098 | Albrecht | Nov. 19, 1907 |
| 896,249 | Rosenblatt | Aug. 18, 1908 |
| 899,189 | Sahulka | Sept. 22, 1908 |
| 1,881,056 | McBain | Oct. 4, 1932 |
| 2,126,470 | Johnson | Aug. 9, 1938 |
| 2,169,016 | Baker | Aug. 8, 1939 |
| 2,186,843 | Shoults | Jan. 9, 1940 |
| 2,242,435 | Parvin et al. | May 20, 1941 |
| 2,253,653 | Robinson et al. | Aug. 26, 1941 |
| 2,316,801 | McLaughlin et al. | Apr. 20, 1943 |
| 2,321,612 | Nye | June 15, 1943 |
| 2,370,481 | Morgan | Feb. 27, 1945 |
| 2,424,321 | King | July 22, 1947 |
| 2,442,021 | Rose | May 25, 1948 |
| 2,500,595 | Young et al. | Mar. 14, 1950 |

FOREIGN PATENTS

| Number | Country | Date |
|---|---|---|
| 508,067 | Great Britain | June 21, 1939 |
| 370,230 | Germany | Mar. 1, 1923 |